(12) United States Patent
Kitamura et al.

(10) Patent No.: US 9,546,222 B2
(45) Date of Patent: Jan. 17, 2017

(54) METHOD FOR PRODUCING LOW-SUBSTITUTED HYDROXYPROPYLCELLULOSE

(75) Inventors: Akira Kitamura, Joetsu (JP); Takahiro Suzuki, Joetsu (JP); Mitsuo Narita, Joetsu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 668 days.

(21) Appl. No.: 13/230,959

(22) Filed: Sep. 13, 2011

(65) Prior Publication Data

US 2012/0065390 A1 Mar. 15, 2012

(30) Foreign Application Priority Data

Sep. 14, 2010 (JP) ................. 2010-205483

(51) Int. Cl.
| | |
|---|---|
| *C08B 37/00* | (2006.01) |
| *C08B 11/08* | (2006.01) |
| *C08B 1/08* | (2006.01) |
| *C08B 11/20* | (2006.01) |

(52) U.S. Cl.
CPC ................. *C08B 11/08* (2013.01); *C08B 1/08* (2013.01); *C08B 11/20* (2013.01)

(58) Field of Classification Search
CPC ..................................... C08B 37/00
USPC .................... 536/124, 84, 95, 120
See application file for complete search history.

(56) References Cited

U.S. PATENT DOCUMENTS

| | | | |
|---|---|---|---|
| 4,015,067 A | 3/1977 | Liu et al. | |
| 4,612,345 A | 9/1986 | Hess | |
| 4,614,545 A | 9/1986 | Hess | |
| 5,386,055 A * | 1/1995 | Lee .......................... | B01J 3/008 210/180 |
| 5,476,668 A | 12/1995 | Kobayashi et al. | |
| 6,228,416 B1 | 5/2001 | Reibert et al. | |
| 6,235,893 B1 * | 5/2001 | Reibert et al. ................ | 536/86 |
| 6,849,729 B2 * | 2/2005 | Obara .................... | A61K 8/731 536/100 |

| | | | |
|---|---|---|---|
| 2001/0007028 A1 | 7/2001 | Schulz | |
| 2001/0020090 A1 | 9/2001 | Becker et al. | |
| 2008/0039621 A1 | 2/2008 | Maruyama et al. | |
| 2009/0176277 A1 | 7/2009 | Hayakawa et al. | |

FOREIGN PATENT DOCUMENTS

| | | |
|---|---|---|
| CN | 101001881 A | 7/2007 |
| CN | 101190948 A | 6/2008 |
| EP | 0 957 112 A2 | 11/1999 |
| EP | 1 878 752 A1 | 1/2008 |
| JP | 61-264001 | 11/1986 |
| JP | 2001-288201 A | 10/2001 |
| JP | 2005-8827 A | 1/2005 |
| JP | 2005-239845 A | 9/2005 |
| JP | 2008-133432 A | 6/2008 |
| WO | WO 00/32637 A1 | 6/2000 |
| WO | WO 0032637 A1 * | 6/2000 |
| WO | WO 03/018637 A1 | 3/2003 |

OTHER PUBLICATIONS

LV, B.; "Study on Characteristics and Properties of Chemical Reaction of Cellulose Modified by the Steam Explosion;" Master Thesis of North Chine Institute of Technology; dated Dec. 31, 2002.
Office Action for Chinese Application No. 201110269000.8; dated Aug. 2, 2013.
Extended European Search Report for European Patent Application No. 11 18 0064, mailed Jan. 24, 2014.
Office Action from Japanese Patent Application No. 2011-196133, dated Jul. 29, 2014.
Office Action for Chinese Application No. 201110269000.8 dated Apr. 14, 2014.

* cited by examiner

*Primary Examiner* — Sudhakar Katakam
*Assistant Examiner* — Everett White
(74) *Attorney, Agent, or Firm* — Alston & Bird LLP

(57) ABSTRACT

Provided is a method for producing low-substituted hydroxypropylcellulose in which depolymerization capable of achieving a target viscosity in a short time is carried out safely after an etherification reaction step. More specifically, provided is a method for producing low-substituted hydroxypropylcellulose having a degree of hydroxypropoxy substitution of from 9.5 to 16.0% by weight, comprising at least a step of reacting alkali cellulose with an etherifying agent and a step of carrying out depolymerization after the reaction.

2 Claims, No Drawings

METHOD FOR PRODUCING LOW-SUBSTITUTED HYDROXYPROPYLCELLULOSE

FIELD OF THE INVENTION

The present invention relates to a production method of cellulose ether to be utilized in chemical fields, pharmaceutical fields and the like.

BACKGROUND

Examples of a depolymerization method for reducing the viscosity of water-soluble cellulose ether include methods of using ozone or a volatile acid such as hydrogen peroxide or hydrogen halide. It is, however, presumed to be difficult to industrially materialize these methods because they use expensive reagents, leave reagents in the resulting products, or require special equipment.

Japanese Patent Application Unexamined Publication No. 61-264001 proposes a method for adjusting an oxygen amount in a reactor in preparation of alkali cellulose. Since the degree of polymerization of cellulose is reduced by a reaction (depolymerization reaction) between oxygen and cellulose in the presence of an alkali, cellulose ether having a lower viscosity can be obtained when an amount of oxygen is greater. This method is advantageous because it can use oxygen present in the air so that it does not require special equipment and in addition, the oxygen does not remain in the product thus obtained. In this method, a pulp is not depolymerized just by bringing the pulp into contact with oxygen. The pulp is depolymerized by reacting with oxygen in the reactor as the pulp is brought into contact with the alkali.

In general, there is a possibility of explosion during depolymerization after a step of etherification reaction in comparison with depolymerization during a step of preparing alkali cellulose so that the depolymerization after the step of etherification reaction has been avoided as much as possible. Accordingly, regarding depolymerization of water-soluble cellulose ether, it is the common practice to carry out the depolymerization in the step of preparing alkali cellulose in which a large amount of alkali is present and there is no risk of explosion by an etherifying agent.

SUMMARY

In the production of low-substituted hydroxypropylcellulose insoluble in water but soluble in an aqueous alkali solution, alkali hydroxide added in a step of preparing alkali cellulose serves as a catalyst so that a large amount of alkali is present in the reaction system even after the step of etherification reaction. The present inventors consider that depolymerization for the production of low-substituted hydroxypropylcellulose can be carried out during preparation of alkali cellulose or after the step of etherification reaction.

The present inventors also consider that depolymerization after the step of etherification reaction proceeds at a higher depolymerization rate than depolymerization during preparation of alkali cellulose so that a target viscosity can be achieved in a short time. In the production of low-substituted hydroxypropylcellulose, time spent for a series of steps requiring a reactor such as reaction and depolymerization accounts for the great proportion of the total time spent for the production. A reduction in depolymerization time therefore contributes to reduction in a total production time for the low-substituted hydroxypropylcellulose, leading to an improvement in production efficiency.

However, when the etherification reaction does not proceed sufficiently, propylene oxide added as an etherifying agent remains in the reactor so that there is a possibility of the propylene oxide concentration in the reactor falling within an explosive range, depending on the oxygen concentration or the propylene oxide concentration in the reactor.

An object of the present invention is to safely carry out depolymerization after the step of etherification reaction to provide low-substituted hydroxypropylcellulose having a target viscosity in a short time.

With a view to satisfying the above object, the present inventors have conducted an intensive investigation. As a result, it has been found that a target viscosity can be achieved in a short time by carrying out depolymerization after the step of etherification reaction and that particularly preferably, adjustment of an oxygen concentration in a reactor makes it possible to carry out depolymerization safely while avoiding risk of explosion by propylene oxide, leading to the completion of a method for producing low-substituted hydroxypropylcellulose according to the present invention.

In the present invention, there is provided a method for producing low-substituted hydroxypropylcellulose having a degree of hydroxypropoxy substitution of from 9.5 to 16.0% by weight, the method comprising at least the steps of reacting alkali cellulose with an etherifying agent to obtain low-substituted hydroxypropylcellulose and depolymerizing the obtained low-substituted hydroxypropylcellulose.

The production method of the present invention makes it possible to safely provide low-substituted hydroxypropylcellulose having a target viscosity in a short depolymerization time while avoiding the risk of explosion.

DETAILED DESCRIPTION

The present invention will be described more specifically.

Alkali cellulose can be obtained preferably by bringing a starting material pulp into contact with an alkali metal oxide solution. More specifically, it can be obtained, for example, by directly adding dropwise or atomizing an alkali metal oxide solution to a starting material pulp, or by dipping a starting material pulp in an alkali metal oxide solution and then pressing the resulting pulp to remove therefrom an excess alkali metal oxide solution. The former method is more suited to the present invention.

Examples of the starting material pulp include wood pulp and linter pulp. The starting material pulp in any form such as sheet or ground powder can be used without limitation. The degree of polymerization of the pulp can be appropriately selected, depending on the target viscosity of cellulose ether.

Although no particular limitation is imposed on the alkali metal hydroxide solution insofar as it can provide alkali cellulose, it is preferably an aqueous solution of sodium hydroxide or potassium hydroxide. From the economical viewpoint, an aqueous solution of sodium hydroxide is particularly preferred. The alkali metal oxide solution has a concentration of preferably from 20 to 50% by weight, particularly preferably from 30 to 40% by weight. When the concentration of the aqueous solution of sodium hydroxide is below 20% by weight, the etherification may not proceed sufficiently. When it is more than 50% by weight, the alkali cellulose thus prepared may have a non-uniform composition so that uniform depolymerization may be prevented.

An alkali cellulose product composition thus obtained by the above contact comprises at least the alkali cellulose, the alkali metal oxide solution and water. The amounts of the alkali metal oxide solution and water have an influence on the etherification reaction efficiency and the amount of impurities produced during the reaction.

With regard to the alkali cellulose product composition most suited for providing for the reaction with an etherifying agent, in the method comprising the step of directly adding dropwise or atomizing an alkali metal oxide solution to a starting material pulp, a weight ratio of the alkali metal oxide solution to the cellulose in the alkali cellulose is preferably from 0.1 to 0.6, more preferably from 0.2 to 0.45 and a weight ratio of water to the cellulose in the alkali cellulose is preferably from 0.3 to 1.5, more preferably from 0.45 to 1.0. In the method comprising the steps of dipping a starting material pulp in an alkali metal oxide solution and then pressing the resulting pulp to remove therefrom an excess alkali metal oxide solution, a weight ratio of the alkali metal oxide solution to the cellulose in the alkali cellulose is preferably from 0.1 to 1.0, more preferably from 0.2 to 0.8 and a weight ratio of water to the cellulose in the alkali cellulose is preferably from 0.1 to 2.0, more preferably from 0.3 to 1.0. When the weight ratio of the alkali metal oxide solution to the cellulose in the alkali cellulose or the ratio of water to the cellulose in the alkali cellulose is lower than the above range, the etherification reaction may not proceed sufficiently, which may result in industrial inefficiency. When the weight ratio of the alkali metal oxide solution to the cellulose in the alkali cellulose or the ratio of water to the cellulose in the alkali cellulose is higher than the above range, an amount of impurities produced during the reaction may increase and it may not be possible to obtain a product with a desired degree of hydroxypropyl substitution.

After preparation of the alkali cellulose, an inner atmosphere of the reactor is replaced with an inert gas (preferably, nitrogen or helium). This makes it possible to reduce an oxygen concentration in the reactor during a next etherification reaction and thereby carry out the etherification reaction safely. In addition, it is possible to produce low-substituted hydroxypropylcellulose having no variations in viscosity by replacing an inner atmosphere of the reactor with an inert gas and keeping an amount of oxygen in the reactor at a certain level or lower.

The subsequent etherification reaction is carried by thoroughly mixing the alkali cellulose and propylene oxide in the reactor. The propylene oxide may be added for the reaction so that a molar ratio of propylene oxide to the cellulose in the alkali cellulose is preferably from 0.15 to 0.2, especially preferably from 0.18 to 0.2. When the amount of propylene oxide is below the ratio of 0.15 or beyond the ratio of 0.2, the degree of hydroxypropoxyl substitution may not reach a predetermined value.

The reaction temperature is preferably from 30 to 80° C., particularly preferably from 50 to 70° C. Reaction temperatures below 30° C. may be economically disadvantageous because at such temperatures, it takes long hours to complete the etherification reaction. Reaction temperatures exceeding 80° C. may cause excessive substitution of hydroxypropoxyl groups. The reaction time is preferably from about 1 to 5 hours. Propylene oxide can be added by using any method such as one-time addition or divided addition of a predetermined amount into a reactor, or a continuous addition for a predetermined period of time.

In the initial stage of the etherification reaction step, the internal pressure of the reactor increases due to the addition of propylene oxide. After that, with the progress of the etherification reaction, propylene oxide is consumed so that the internal pressure of the reactor shows a gradual decrease. After all, the internal pressure becomes equal to that before addition of propylene oxide. The step of etherification reaction is therefore continued until the whole portion of propylene oxide is consumed and the internal pressure of the reactor becomes equal to that before addition of propylene oxide.

The depolymerization in the present invention is characterized in that it is carried out after addition of an etherifying agent because a target viscosity can be achieved in a short time. The term "target viscosity" of the low-substituted hydroxypropylcellulose of the present invention means a viscosity lower than the viscosity of low-substituted hydroxypropylcellulose produced by a method without supplying oxygen. More specifically, the depolymerization is performed to reduce the viscosity at 20° C. of a 2% by weight aqueous solution by preferably from 20 to 50%, particularly preferably from 35 to 40% from the viscosity before depolymerization.

The depolymerization reaction is conducted preferably while stirring thoroughly in the reactor. This enables uniform distribution of the alkali metal hydroxide solution, oxygen or an oxygen-containing gas, and heat in the cellulose ether.

The propylene oxide as the etherifying agent in the present invention is a flammable gas. Presence of three factors, a flammable gas, oxygen and an ignition source, is essential for the combustion of the flammable gas. Among them, it is difficult to eliminate or control the ignition source and the flammable gas completely. In order to prevent explosion, an inert gas (gas such as nitrogen) should be added to adjust an oxygen concentration. The minimum oxygen concentration necessary for continuously burning the inflammable gas can be found from a ternary diagram made of the inflammable gas, air (oxygen) and an inert gas.

In the present invention, because of the above-described reason, it is preferred to adjust the oxygen concentration in the reactor after the etherification reaction in order to conduct safe depolymerization after the etherification reaction step. The oxygen concentration in the reactor can be calculated based on the gas low, taking the kind of a gas in the reactor, a space volume in the reactor, atmospheric pressure, gas temperature and the like into consideration. With regard to the adjustment method of the oxygen concentration, the degree of vacuum in the reactor may be adjusted, for example, by discharging a gas from the reactor and then re-filling the reactor with an oxygen-free gas such as nitrogen gas or helium gas, or by feeding the reactor with an oxygen-free gas for purge. By this operation, an amount of oxygen entering into the reactor can be adjusted when the reactor is re-filled with an oxygen-containing gas. After oxygen is supplied, the reactor is hermetically sealed to prevent oxygen from entering from the outside.

For the supply of oxygen, an oxygen gas or an oxygen-containing gas such as air can be used. Air is preferred because it is of low cost and highly safe. Oxygen is supplied, for example, by pressing an oxygen gas or an oxygen-containing gas into the reactor, or by discharging a gas from the reactor and then filling the reactor with an oxygen-containing gas.

In the present invention, the oxygen concentration during depolymerization after the etherification reaction is preferably less than 7.8% by volume, more preferably from 3 to 7.5% by volume, particularly preferably from 5 to 7% by volume. Oxygen concentrations of 7.8% by volume or greater may not be preferred because they approach an explosive range and increase the risk.

The oxygen concentration in the reactor during depolymerization can be determined appropriately, depending on the degree of polymerization of a pulp employed, the target viscosity of the low-substituted hydroxypropylcellulose, depolymerization temperature of the low-substituted hydroxypropylcellulose by oxygen, or depolymerization reaction time.

The reaction product obtained by the depolymerization reaction is subjected to a purification step in a conventional manner to produce low-substituted hydroxypropylcellulose. The degree of the hydroxypropoxy group substitution for the produced low-substituted hydroxypropylcellulose is 9.5 to 16.0% by weight, preferably 10.0 to 13.0% by weight, more preferably 10.3 to 11.2% by weight. When the degree of the hydroxypropoxy group substitution is lower than 9.5% by weight, a target viscosity cannot be obtained in a short period of time.

EXAMPLES

The present invention will hereinafter be described in detail by Examples and Comparative Examples. It should not be construed that the present invention is limited to or by Examples.

Example 1

A reactor having a volume of 144 liter and equipped with an internal stirring structure was charged with 8 kg of a powdery pulp. Under stirring conditions, 6.32 kg of a 25% by weight aqueous solution of sodium hydroxide was added thereto for 6 minutes, followed by stirring for 14 minutes to prepare alkali cellulose.

The reactor was then purged with nitrogen. After purging with nitrogen, 1.48 kg of propylene oxide was added while keeping the reactor at 60° C. and an etherification reaction was carried out for 75 minutes.

After the etherification reaction, a gauge pressure in the reactor was reduced to minus 0.080 MPa under stirring conditions. Then, the pressure in the reactor was increased to minus 0.0145 MPa with nitrogen. As soon as an air supply valve was opened to increase the pressure to 0 MPa, a vacuum valve and the air supply valve of the reactor were closed. By this operation, the oxygen concentration in the reactor was adjusted to 3.0% by volume and depolymerization of the etherification reaction product was carried out. The depolymerization was carried out for 36 minutes after adjustment of the oxygen concentration was started. In succession, purging of the reactor with nitrogen was conducted and then, the reaction product was taken out from the reactor.

A biaxial kneader was then charged with 17.5 kg of warm water of 45° C., 0.5 kg of a 29% by weight aqueous acetic acid solution and 7.04 kg of the reaction product to dissolve a portion of the reaction product in them. Then, 4.7 kg of a 29% by weight aqueous acetic acid solution was added to the resulting solution to precipitate the reaction product. After washing with hot water of 90° C., the precipitate was dehydrated in a centrifugal washer. The cake thus obtained was dried to obtain low-substituted hydroxypropylcellulose.

As a result of measurement at a rotation speed of 30 rpm by using a B-type Brookfield rotational viscometer, the viscosity at 20° C. of 2% by weight low-substituted hydroxypropylcellulose in a 10% by weight aqueous solution of sodium hydroxide was 103.5 mPa·s. The degree of the hydroxypropoxy group substitution was 11.0%.

Example 2

A reactor having a volume of 144 liter and equipped with an internal stirring structure was charged with 8 kg of a powdery pulp. Under stirring conditions, 6.32 kg of a 35% by weight aqueous solution of sodium hydroxide was added thereto for 6 minutes, followed by stirring for 14 minutes to prepare alkali cellulose.

The reactor was then purged with nitrogen. After purging with nitrogen, 1.48 kg of propylene oxide was added while keeping the reactor at 60° C. and an etherification reaction was carried out for 75 minutes.

After the etherification reaction, a gauge pressure in the reactor was reduced to minus 0.080 MPa under stirring conditions. Then, the pressure in the reactor was increased to minus 0.024 MPa with nitrogen. As soon as an air supply valve was opened to increase the pressure to 0 MPa, a vacuum valve and the air supply valve of the reactor were closed. By this operation, the oxygen concentration in the reactor was adjusted to 5.0% by volume and depolymerization of the etherification reaction product was carried out. The depolymerization was carried out for 30 minutes after adjustment of the oxygen concentration was started. In succession, purging of the reactor was conducted with nitrogen. The reaction product was then taken out from the reactor and subjected to the same treatments as in Example 1.

As a result of measurement at a rotation speed of 30 rpm by using a B-type Brookfield rotational viscometer, the viscosity at 20° C. of 2% by weight low-substituted hydroxypropylcellulose in a 10% by weight aqueous solution of sodium hydroxide was 100.7 mPa·s. The degree of the hydroxypropoxy group substitution was 10.4%.

Example 3

A reactor having a volume of 144 liter and equipped with an internal stirring structure was charged with 8 kg of a powdery pulp. Under stirring conditions, 6.32 kg of a 35% by weight aqueous solution of sodium hydroxide was added for 6 minutes, followed by stirring for 14 minutes to prepare alkali cellulose.

The reactor was then purged with nitrogen. After purging with nitrogen, 1.48 kg of propylene oxide was added while keeping the reactor at 60° C. and an etherification reaction was carried out for 75 minutes.

After the etherification reaction, a gauge pressure in the reactor was reduced to minus 0.080 MPa under stirring conditions. Then, the pressure in the reactor was increased to minus 0.0336 MPa with nitrogen. As soon as an air supply valve was opened to increase the pressure to 0 MPa, a vacuum valve and the air supply valve of the reactor were closed. By this operation, the oxygen concentration in the reactor was adjusted to 6.8% by volume and depolymerization of the etherification reaction product was carried out. The depolymerization was carried out for 27 minutes after adjustment of the oxygen concentration was started. In succession, purging of the reactor was conducted with nitrogen. The reaction product was then taken out from the reactor and subjected to the same treatments as in Example 1.

As a result of measurement at a rotation speed of 30 rpm by using a B-type Brookfield rotational viscometer, the viscosity at 20° C. of 2% by weight low-substituted hydroxypropylcellulose in a 10% by weight aqueous solution of sodium hydroxide was 102.2 mPa·s. The degree of the hydroxypropoxy group substitution was 10.9%.

Example 4

A reactor having a volume of 144 liter and equipped with an internal stirring structure was charged with 8 kg of a powdery pulp. Under stirring conditions, 6.32 kg of a 35% by weight aqueous solution of sodium hydroxide was added for 6 minutes, followed by stirring for 14 minutes to prepare alkali cellulose.

The reactor was then purged with nitrogen. After purging with nitrogen, 1.52 kg of propylene oxide was added while keeping the reactor at 60° C. and an etherification reaction was carried out for 75 minutes.

After the etherification reaction, a gauge pressure in the reactor was reduced to minus 0.080 MPa under stirring conditions. Then, the pressure in the reactor was increased to minus 0.0336 MPa with nitrogen. As soon as an air supply valve was opened to increase the pressure to 0 MPa, a vacuum valve and the air supply valve of the reactor were closed. By this operation, the oxygen concentration in the reactor was adjusted to 6.8% by volume and depolymerization of the etherification reaction product was carried out. The depolymerization was carried out for 27 minutes after adjustment of the oxygen concentration was started. In succession, purging of the reactor was conducted with nitrogen. The reaction product was then taken out from the reactor and subjected to the same treatments as in Example 1.

As a result of measurement at a rotation speed of 30 rpm by using a B-type Brookfield rotational viscometer, the viscosity at 20° C. of 2% by weight low-substituted hydroxypropylcellulose in a 10% by weight aqueous solution of sodium hydroxide was 104.0 mPa·s. The degree of the hydroxypropoxy group substitution was 12.0%.

Comparative Example 1

A reactor having a volume of 144 liter and equipped with an internal stirring structure was charged with 8 kg of a powdery pulp. After the gauge pressure in the reactor was reduced to minus 0.069 MPa, the pressure in the reactor was increased to atmospheric pressure with nitrogen. Immediately after that, a vacuum valve and an air supply valve of the reactor were closed. By this operation, the oxygen concentration in the reactor during depolymerization was adjusted to 7.0% by volume. Under stirring conditions, 6.41 kg of a 35% by weight aqueous solution of sodium hydroxide was added for 10 minutes to prepare alkali cellulose. As a result, it took 15 minutes from the initiation of the oxygen concentration adjustment to preparation of the alkali cellulose.

After preparation of the alkali cellulose, stirring was performed while keeping the reactor at 60° C., whereby depolymerization of the cellulose was carried out. The depolymerization was carried out for 45 minutes from the starting of the addition of sodium hydroxide.

After the depolymerization, the reactor was purged with nitrogen. Then, 1.48 kg of propylene oxide was added while keeping the reactor at 60° C. and an etherification reaction was carried out for 75 minutes.

The etherification reaction was followed by purging of the reactor with nitrogen. Then, the reaction product was taken out from the reactor.

A biaxial kneader was then charged with 17.5 kg of warm water of 45° C., 0.5 kg of a 29% by weight aqueous acetic acid solution and 7.04 kg of the reaction product to dissolve a portion of the reaction product in them. Then, 4.7 kg of 29% by weight aqueous acetic acid solution was added to the resulting solution to precipitate the reaction product. The precipitate was washed with hot water of 90° C. and then dehydrated in a centrifugal washer. The cake thus obtained was dried to obtain low-substituted hydroxypropylcellulose.

As a result of measurement at a rotation speed of 30 rpm by using a B-type Brookfield rotational viscometer, the viscosity at 20° C. of 2% by weight low-substituted hydroxypropylcellulose in a 10% by weight aqueous solution of sodium hydroxide was 103.1 mPa·s. The degree of the hydroxypropoxy group substitution was 10.8%.

TABLE 1

| | | conditions for depolymerization | | | property of | degree of hydroxy- |
|---|---|---|---|---|---|---|
| | | timing of depolymerization | oxygen concentration (% by volume) | depolymerization time (minute) | solution viscosity (mPa · s) | propoxy substitution (% by weight) |
| Example 1 | | after etherification reaction | 3.0 | 36 | 103.5 | 11.0 |
| Example 2 | | after etherification reaction | 5.0 | 30 | 100.7 | 10.4 |
| Example 3 | | after etherification reaction | 6.8 | 27 | 102.2 | 10.9 |
| Example 4 | | after etherification reaction | 6.8 | 27 | 104.0 | 12.0 |
| Comp. Ex. 1 | | during preparation of alkali cellulose | 6.8 | 45 | 103.1 | 10.8 |

The invention claimed is:

1. A method for producing low-substituted hydroxypropylcellulose having a degree of hydroxypropoxy substitution of from 9.5 to 16.0% by weight, comprising at least the steps of:

reacting alkali cellulose with an etherifying agent to obtain low-substituted hydroxypropylcellulose, and depolymerizing the obtained low-substituted hydroxypropylcellulose, wherein the step of depolymerizing comprises adjusting an oxygen concentration in a reactor to 3 to 7.5% by volume, and wherein the hydroxypropylcellulose is insoluble in water, but soluble in an alkali solution.

2. The method for producing low-substituted hydroxypropylcellulose according to claim 1, wherein the alkali cellulose is obtained by bringing a pulp into contact with an alkali metal oxide solution.

* * * * *